US011269410B1

(12) United States Patent
Richter et al.

(10) Patent No.: US 11,269,410 B1
(45) Date of Patent: Mar. 8, 2022

(54) METHOD AND DEVICE FOR PERFORMANCE-BASED PROGRESSION OF VIRTUAL CONTENT

(71) Applicant: Apple Inc., Cupertino, CA (US)

(72) Inventors: Ian M. Richter, Los Angeles, CA (US); Stephen Patrick Mullen, II, Los Angeles, CA (US); Michael Elliot Reisman, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/868,854

(22) Filed: May 7, 2020

Related U.S. Application Data

(60) Provisional application No. 62/861,893, filed on Jun. 14, 2019.

(51) Int. Cl.
*G06F 3/01* (2006.01)
*G06F 3/0481* (2013.01)
*G06F 3/04815* (2022.01)

(52) U.S. Cl.
CPC .......... *G06F 3/013* (2013.01); *G06F 3/04815* (2013.01); *G06F 3/011* (2013.01); *G06F 2203/0382* (2013.01)

(58) Field of Classification Search
CPC ...... G06F 3/013; G06F 3/04815; G06F 3/011; G06F 2203/0382
See application file for complete search history.

(56) References Cited

U.S. PATENT DOCUMENTS

| 5,375,610 | A | | 12/1994 | Lacourse et al. |
| 5,805,120 | A | * | 9/1998 | Yamada ............... A63F 9/0291 345/7 |
| 5,907,328 | A | * | 5/1999 | Brush II ............ G06F 3/04815 715/863 |
| 7,074,168 | B1 | | 7/2006 | Farnes et al. |
| 7,927,216 | B2 | * | 4/2011 | Ikeda .................... A63F 13/235 463/38 |
| 9,898,887 | B2 | * | 2/2018 | Froy ...................... A63F 13/40 |
| 9,907,997 | B2 | | 3/2018 | Cusey et al. |

(Continued)

FOREIGN PATENT DOCUMENTS

WO 2008/129442 A1 10/2008

OTHER PUBLICATIONS

"Flicksync", Retrieved from the Internet Apr. 3, 2019: https://readyplayerone.fandom.com/wiki/Flicksync?oldid=5843,1 Page.

*Primary Examiner* — Mihir K Rayan
(74) *Attorney, Agent, or Firm* — Fernando & Partners, LLP

(57) ABSTRACT

In some implementations, a method includes: obtaining first input data while presenting a computer-generated reality (CGR) environment from the perspective of a first character associated with a first time slice within predetermined content; determining whether or not the first input data satisfies first performance criteria associated with the first character for the first time slice within the predetermined content; and, in response to determining that the first input data satisfies the first performance criteria associated with the first character for the first time slice within the predetermined content, updating the CGR environment from the perspective of the first character associated with a second time slice within the predetermined content.

26 Claims, 10 Drawing Sheets

(56) References Cited

U.S. PATENT DOCUMENTS

| | | |
|---|---|---|
| 10,976,178 B2 * | 4/2021 | Piemonte .............. G05D 1/0212 |
| 11,010,982 B1 * | 5/2021 | Guerra Filho ........ G06T 19/006 |
| 2003/0032484 A1 * | 2/2003 | Ohshima ................. A63F 13/10 |
| | | 463/43 |
| 2004/0219498 A1 | 11/2004 | Davidson |
| 2005/0187437 A1 * | 8/2005 | Matsugu .............. A61B 5/4803 |
| | | 600/301 |
| 2013/0097565 A1 * | 4/2013 | Freeding ................. G09B 5/06 |
| | | 715/863 |
| 2015/0220152 A1 * | 8/2015 | Tait ...................... G02B 27/017 |
| | | 345/156 |
| 2017/0212771 A1 * | 7/2017 | Weissberg ........... G06F 3/04845 |
| 2017/0278306 A1 * | 9/2017 | Rico ................... G06F 3/04815 |

* cited by examiner

| Content 530 | Scene 505A | Time Slice 515A | Character 532A | Dialogue Portion 552 | Dialogue Delivery Portion 554 | Body Pose Portion 556 | Gaze Direction Portion 558 | ... | Other Portion(s) 559 |

METHOD AND DEVICE FOR PERFORMANCE-BASED PROGRESSION OF VIRTUAL CONTENT

CROSS-REFERENCE TO RELATED APPLICATIONS

This application claims the benefit of U.S. Provisional Patent App. No. 62/861,893, filed on Jun. 14, 2019, which is incorporated by reference in its entirety.

TECHNICAL FIELD

The present disclosure generally relates to virtual content (sometimes also referred to herein as "computer-generated reality (CGR) content"), and in particular, to systems, methods, and devices for performance-based progression of virtual content.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space, so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's environment on a handheld display (e.g., an AR-enabled mobile phone or tablet with video pass-through). As another example, a user may experience AR content by wearing a near-eye system or head-mountable enclosure that still allows the user to see his/her surroundings (e.g., glasses with optical see-through). As yet another example, a user may experience VR content by using a near-eye system that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
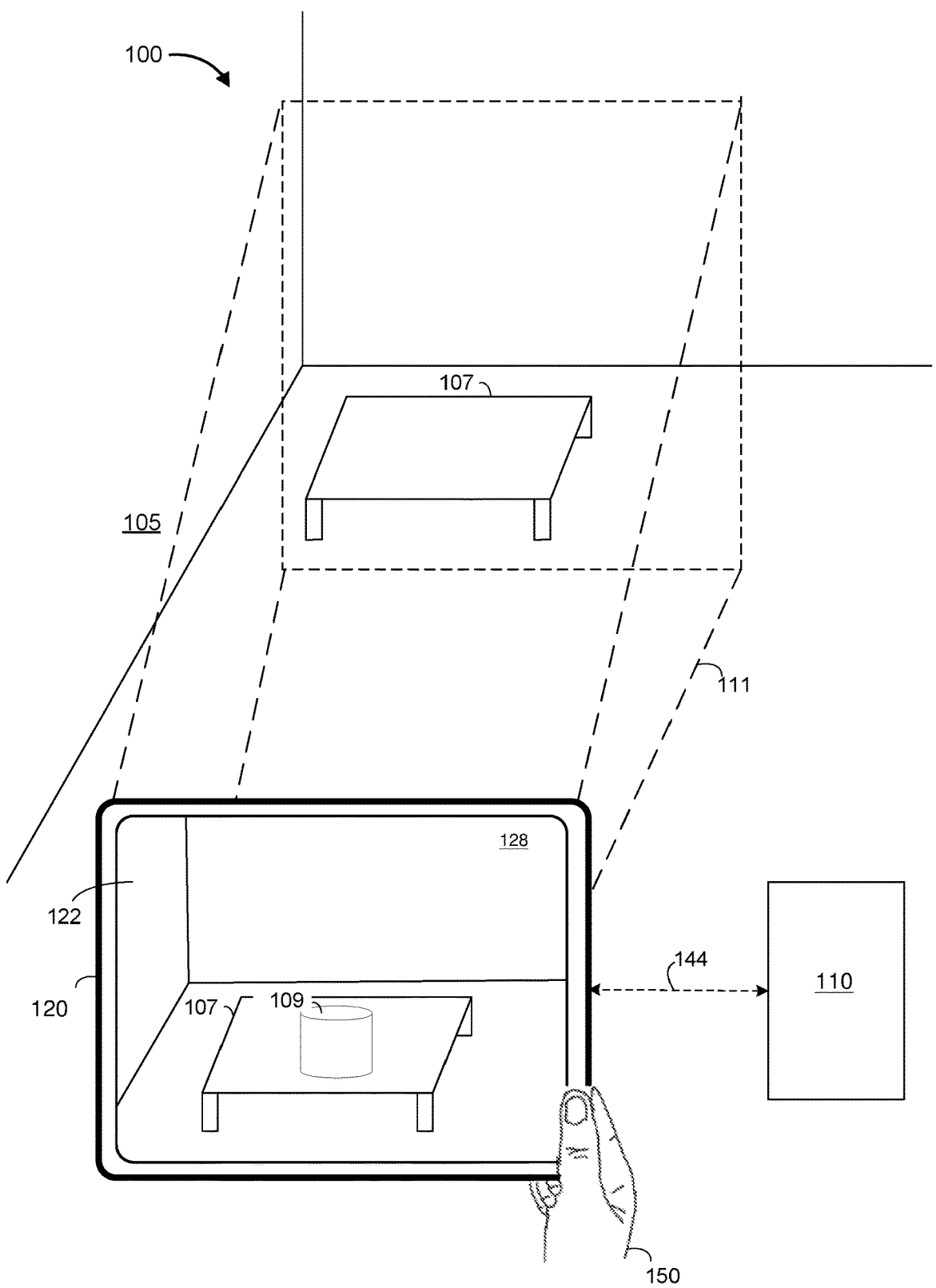
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performance-based progression of computer-generated reality (CGR) content. According to some implementations, the method is performed at a device including non-transitory memory and one or more processors coupled with the non-transitory memory. The method includes: obtaining first input data while presenting a CGR environment from the perspective of a first character associated with a first time slice within predetermined content; determining whether or not the first input data satisfies first performance criteria associated with the first character for the first time slice within the predetermined content; and, in response to determining that the first input data satisfies the first performance criteria associated with the first character for the first time slice within predetermined content, updating the CGR environment from the perspective of the first character associated with a second time slice within the predetermined content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate a CGR experience (sometimes also referred to herein as a "CGR environment") for a user 150 and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents a computer-generated reality (CGR) experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the CGR experience, the electronic device 120 is configured to present CGR content (e.g., a CGR cylinder 109) and to enable video pass-through of the physical environment 105 (e.g., including the table 107) on a display 122. For example, the electronic device 120 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface (e.g., the CGR environment 128) by projecting the CGR content (e.g., the CGR cylinder 109) onto the additive display, which is, in turn, overlaid on the physical environment 105 from the perspective of the user 150. In some implementations, the electronic device 120 presents the user interface by displaying the CGR content (e.g., the CGR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the CGR content (e.g., a single display or one for each eye). For example, the electronic device 120 encloses the field-of-view of the user 150. In such implementations, the electronic device 120 presents the CGR environment 128 by displaying data corresponding to the CGR environment 128 on the one or more displays or by projecting data corresponding to the CGR environment 128 onto the retinas of the user 150.

In some implementations, the electronic device 120 includes an integrated display (e.g., a built-in display) that displays the CGR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR environment 128. In some implementations, the electronic device 120 is replaced with a CGR chamber, enclosure, or room configured to present CGR content in which the user 150 does not wear the electronic device 120.

In some implementations, the controller 110 and/or the electronic device 120 cause a CGR representation of the user 150 to move within the CGR environment 128 based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
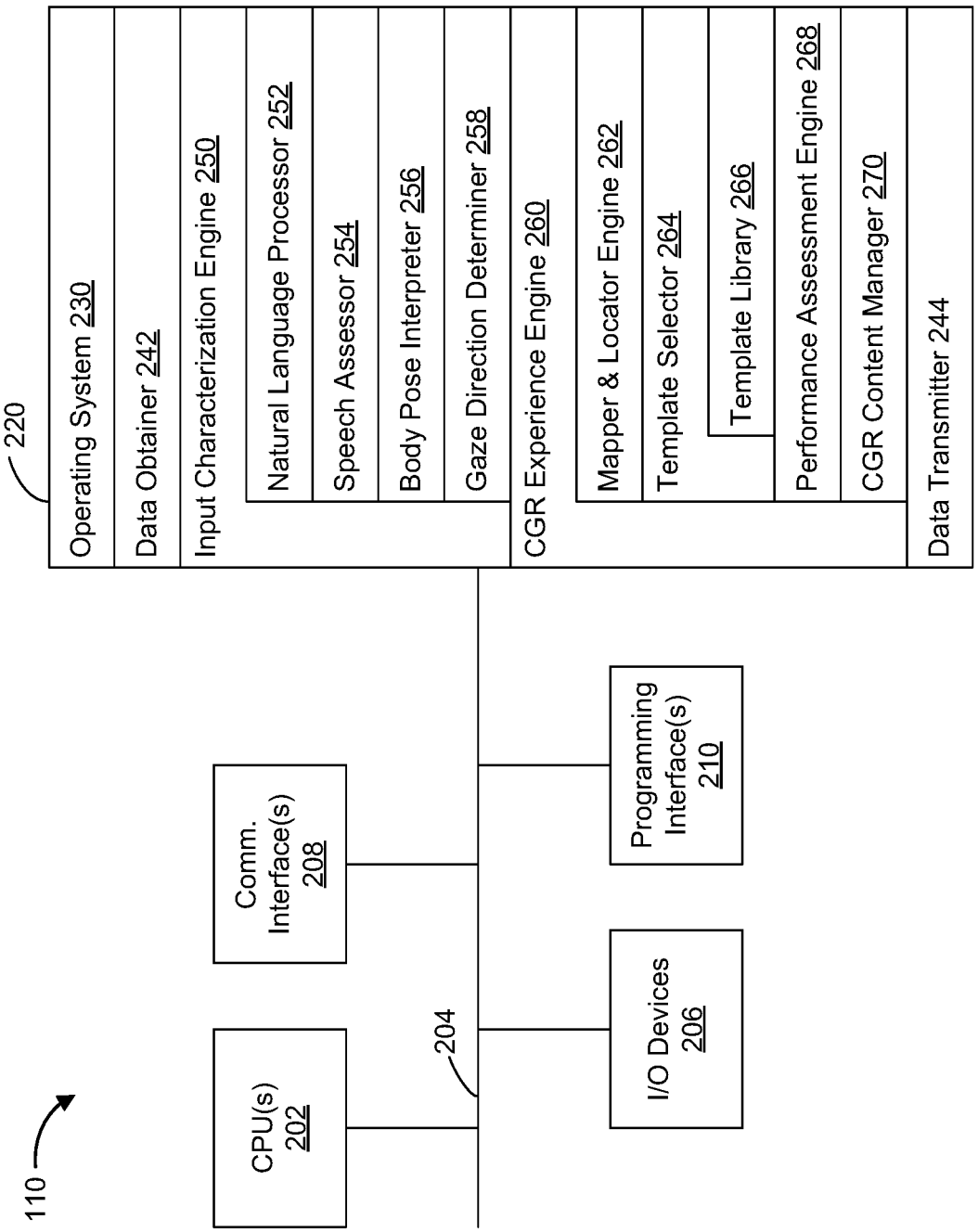
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a data obtainer 242, an input characterization engine 250, a computer-generated reality (CGR) experience engine 260, and a data transmitter 244.

The operating system 230 includes procedures for handling various basic system services and for performing hardware dependent tasks.

In some implementations, the data obtainer 242 is configured to obtain data (e.g., presentation data, user interaction data, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the input characterization engine 250 is configured to generate an input characterization vector for a respective time slice based on input data (e.g., audio data, body pose data, and eye tracking data, which are sometimes collectively referred to herein as "sensor data") obtained from sensors and/or input devices of the controller 110, the electronic device 120, and/or the optional remote input devices. To that end, in various implementations, the input characterization engine 250 includes a natural language processor (NLP) 252, a speech assessor 254, a body pose interpreter 256, and a gaze direction determiner 258. FIG. 5D, described in more detail below, illustrates an input characterization vector 550 associated with a respective time slice-character tuple (e.g., time slice 515A-character 532A)

In some implementations, the input characterization vector includes a dialogue portion that corresponds to the output from the NLP 252. In some implementations, the input characterization vector includes a dialogue delivery portion that corresponds to the output from the speech assessor 254. In some implementations, the input characterization vector includes a body pose portion that corresponds to the output from the body pose interpreter 256. In some implementations, the input characterization vector includes an eye tracking portion that corresponds to the output from the gaze direction determiner 258.

In some implementations, the NLP 252 is configured to perform natural language processing (or another speech recognition technique) on audio data in order to generate the dialogue portion of the input characterization vector. To that end, in various implementations, the NLP 252 includes instructions and/or logic therefor, and heuristics and metadata therefor.

In some implementations, the speech assessor 254 is configured to determine one or more speech characteristics associated with the audio data (e.g., intonation, cadence, accent, diction, articulation, pronunciation, and/or the like) in order to generate the dialogue delivery portion of the input characterization vector. To that end, in various implementations, the speech assessor 254 includes instructions and/or logic therefor, and heuristics and metadata therefor.

In some implementations, the body pose interpreter 256 is configured to determine one or more pose characteristics associated with the body pose data in order to generate the body pose portion of the input characterization vector. To that end, in various implementations, the body pose interpreter 256 includes instructions and/or logic therefor, and heuristics and metadata therefor.

In some implementations, the gaze direction determiner 258 is configured to determine a directionality vector associated with the eye tracking data (e.g., X, Y, and/or focal point coordinates) in order to generate the eye tracking portion of the input characterization vector. To that end, in various implementations, the gaze direction determiner 258 includes instructions and/or logic therefor, and heuristics and metadata therefor.

In some implementations, the CGR experience engine 260 is configured to manage and coordinate one or more CGR experiences for one or more users (e.g., a single CGR experience for one or more users, or multiple CGR experiences for respective groups of one or more users). To that end, in various implementations, the CGR experience engine 260 includes a mapper and locator engine 262, a template selector 264, a performance assessment engine 268, and a CGR content manager 270.

In some implementations, the mapper and locator engine 262 is configured to map the physical environment 105 and to track the position/location of at least the electronic device 120 with respect to the physical environment 105. To that end, in various implementations, the mapper and locator engine 262 includes instructions and/or logic therefor, and heuristics and metadata therefor.

In some implementations, the template selector 264 is configured to select a template characterization vector from a template library 266 based on a current time slice-character tuple. To that end, in various implementations, the template selector 264 includes instructions and/or logic therefor, and heuristics and metadata therefor.

In some implementations, the template library 266 includes a first plurality of template characterization vectors for first predetermined content (e.g., CGR content A, movie B, or the like) indexed based on time slice-character tuples associated with the first predetermined content. In some implementations, the template library 266 further includes a second plurality of template characterization vectors for second predetermined content (e.g., CGR content B, movie B, or the like) indexed based on time slice-character tuples associated with the first predetermined content. FIG. 5C, described in more detail below, illustrates a first template characterization vector 520A associated with a first time slice-character tuple (e.g., time slice 515A-character 532A) and a second template characterization vector 520B associated with a second time slice-character tuple (e.g., time slice 515A-character 532B). As shown in FIG. 5C, both the first template characterization vector 520A and second template characterization vector 520B are associated with a same time slice 515A of predetermined content 530, but the first template characterization vector 520A and second template characterization vector 520B are associated with different characters—the character 532A and the character 532B, respectively.

In some implementations, the performance assessment engine 268 is configured to determine whether the input data satisfies performance criteria associated with a respective time slice-character tuple based on a comparison between one or more portions of the input characterization vector for the respective time slice-character tuple and one or more portions of the selected template characterization vector associated with the respective time slice-character tuple. To that end, in various implementations, the performance assessment engine 268 includes instructions and/or logic therefor, and heuristics and metadata therefor.

In some implementations, the CGR content manager 270 is configured to update the CGR environment based on a next time slice when the input data satisfies the performance criteria associated with the current time slice-character tuple in order to progress to the next time slice. In some implementations, the CGR content manager 270 is configured to maintain the CGR environment based on the current time slice when the input data does not satisfy the performance criteria associated with the current time slice-character tuple in order to prepare for a reattempt of the current time slice. To that end, in various implementations, the CGR content manager 270 includes instructions and/or logic therefor, and heuristics and metadata therefor.

In some implementations, the data transmitter 244 is configured to transmit data (e.g., presentation data, location data, etc.) to at least the electronic device 120. To that end, in various implementations, the data transmitter 244 includes instructions and/or logic therefor, and heuristics and metadata therefor.

Although the data obtainer 242, the input characterization engine 250, the CGR experience engine 260, and the data transmitter 244 are shown as residing on a single device (e.g., the controller 110), it should be understood that in other implementations, any combination of the data obtainer 242, the input characterization engine 250, the CGR experience engine 260, and the data transmitter 244 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
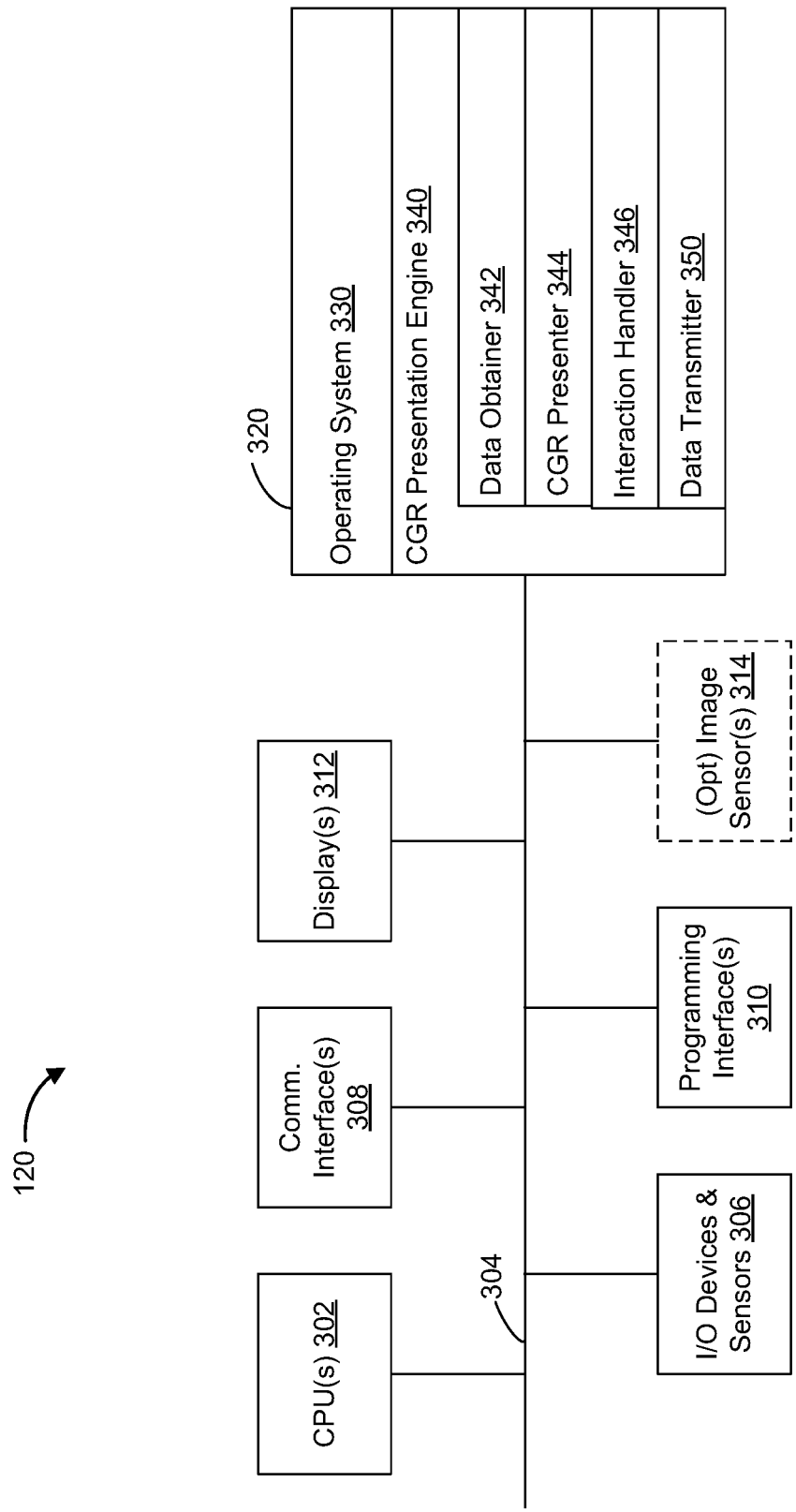
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), and/or the like.

In some implementations, the one or more displays 312 are configured to present the CGR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation engine 340.

The operating system 330 includes procedures for handling various basic system services and for performing hardware dependent tasks. In some implementations, the CGR presentation engine 340 is configured to present CGR content to the user via the one or more displays 312. To that end, in various implementations, the CGR presentation engine 340 includes a data obtainer 342, a CGR presenter 344, an interaction handler 346, and a data transmitter 350.

In some implementations, the data obtainer 342 is configured to obtain data (e.g., presentation data, user interaction data, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the CGR presenter 344 is configured to present and update CGR content via the one or more displays 312. To that end, in various implementations, the CGR presenter 344 includes instructions and/or logic therefor, and heuristics and metadata therefor.

In some implementations, the interaction handler 346 is configured to detect and interpret user interactions with the presented CGR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, etc.) to at least the controller 110. To that end, in various implementations, the data transmitter 350 includes instructions and/or logic therefor, and heuristics and metadata therefor.

Although the data obtainer 342, the CGR presenter 344, the interaction handler 346, and the data transmitter 350 are shown as residing on a single device (e.g., the electronic device 120), it should be understood that in other implementations, any combination of the data obtainer 342, the CGR presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
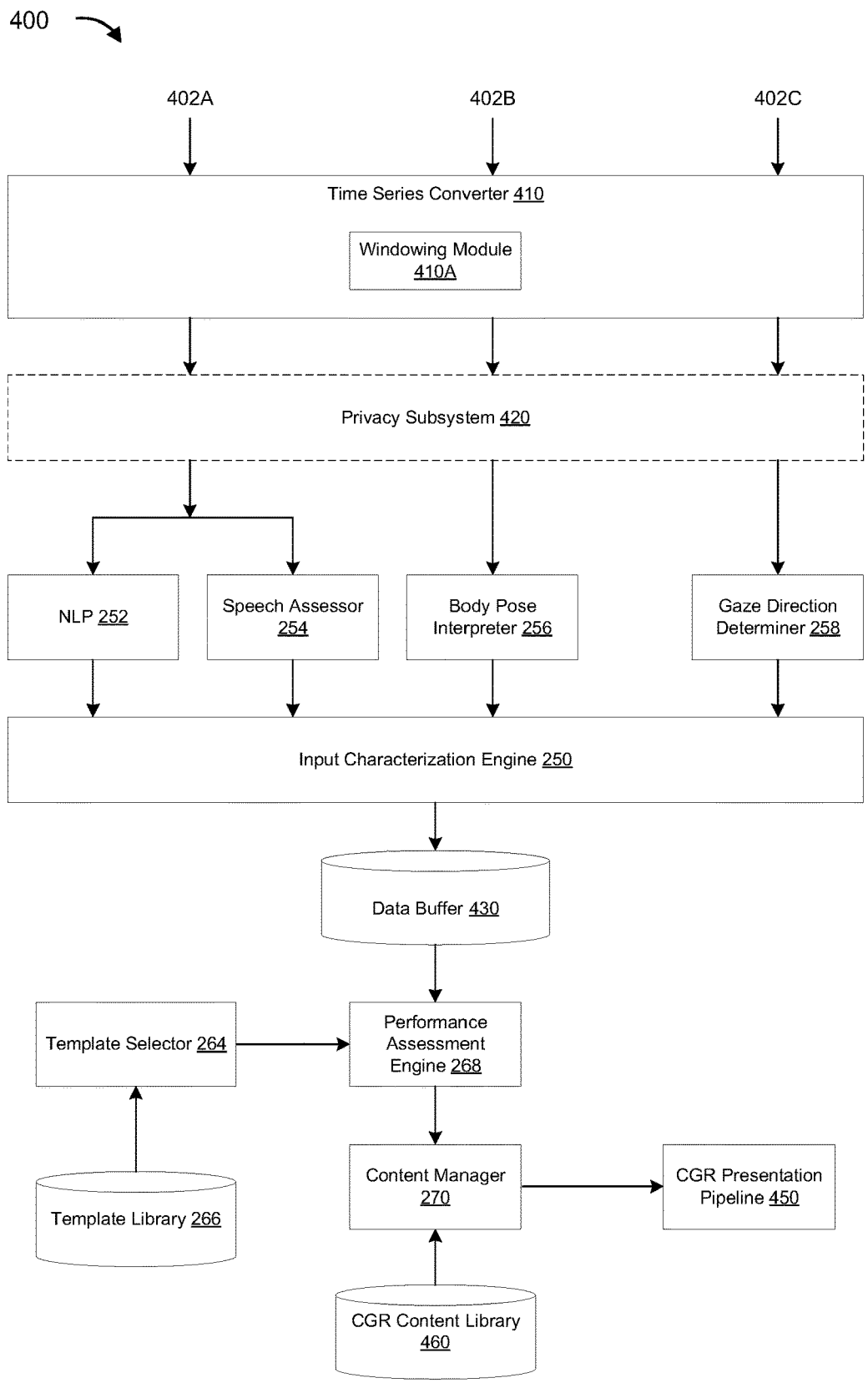
FIG. 4 is a block diagram of an example data processing architecture in accordance with some implementations.

FIG. 4 illustrates an example data processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the data processing architecture 400 is included in the controller 110 shown in FIGS. 1 and 2; the electronic device 120 shown in FIGS. 1 and 3; and/or a suitable combination thereof.

As shown in FIG. 4, the data processing architecture 400 obtains input data (e.g., sensor data) associated with a plurality of modalities, including audio data 402A, body pose data 402B, and eye tracking data 402C. For example, the audio data 402A corresponds to audio signals captured by one or more microphones of the controller 110, the electronic device 120, and/or the optional remote input devices. For example, the body pose data 402B corresponds to images captured by one or more images sensors of the controller 110, the electronic device 120, and/or the optional remote input devices. For example, the eye tracking data 402C corresponds to images captured by one or more images sensors of the controller 110, the electronic device 120, and/or the optional remote input devices.

According to some implementations, the audio data 402A corresponds to an ongoing or continuous time series of values. In turn, the times series converter 410 is configured to generate one or more temporal frames of audio data from a continuous stream of audio data. Each temporal frame of audio data includes a temporal portion of the audio data 402A. In some implementations, the times series converter 410 includes a windowing module 410A that is configured to mark and separate one or more temporal frames or portions of the audio data 402A for times $T_1, T_2, \ldots, T_N$.

In some implementations, each temporal frame of the audio data 402A is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audio data in order to adjust the spectral composition of the one or more temporal frames of the audio data 402A. Additionally and/or alternatively, in some implementations, the windowing module 410A is configured to retrieve the audio data 402A from a non-transitory memory. Additionally and/or alternatively, in some implementations, pre-filtering includes filtering the audio data 402A using a low-noise amplifier (LNA) in order to substantially set a noise floor for further processing. In some implementations, a pre-filtering LNA is arranged prior to the time series converter 410. Those of ordinary skill in the art will appreciate that numerous other pre-filtering techniques may be applied to the audio data, and those highlighted herein are merely examples of numerous pre-filtering options available.

According to some implementations, the body pose data 402B corresponds to an ongoing or continuous time series of images or values. In turn, the times series converter 410 is configured to generate one or more temporal frames of body pose data from a continuous stream of body pose data. Each temporal frame of body pose data includes a temporal portion of the body pose data 402B. In some implementations, the times series converter 410 includes a windowing module 410A that is configured to mark and separate one or more temporal frames or portions of the body pose data 402B for times $T_1, T_2, \ldots, T_N$. In some implementations, each temporal frame of the body pose data 402B is conditioned by a pre-filter or otherwise pre-processed (not shown).

According to some implementations, the eye tracking data 402C corresponds to an ongoing or continuous time series of images or values. In turn, the times series converter 410 is configured to generate one or more temporal frames of eye tracking data from a continuous stream of eye tracking data. Each temporal frame of eye tracking data includes a temporal portion of the eye tracking data 402C. In some implementations, the times series converter 410 includes a windowing module 410A that is configured to mark and separate one or more temporal frames or portions of the eye tracking data 402C for times $T_1, T_2, \ldots, T_N$. In some implementations, each temporal frame of the eye tracking data 402C is conditioned by a pre-filter or otherwise pre-processed (not shown).

In various implementations, the data processing architecture 400 includes a privacy subsystem 420 that includes one or more privacy setting filters associated with user information and/or identifying information (e.g., at least some portions of the audio data 402A, the body pose data 402B, and/or the eye tracking data 402C). In some implementations, the privacy subsystem 420 selectively prevents and/or limits the data processing architecture 400 or portions thereof from obtaining and/or transmitting the user information. To this end, the privacy subsystem 420 receives user preferences and/or selections from the user in response to prompting the user for the same. In some implementations, the privacy subsystem 420 prevents the data processing architecture 400 from obtaining and/or transmitting the user information unless and until the privacy subsystem 420 obtains informed consent from the user. In some implementations, the privacy subsystem 420 anonymizes (e.g., scrambles or obscures) certain types of user information. For example, the privacy subsystem 420 receives user inputs designating which types of user information the privacy subsystem 420 anonymizes. As another example, the privacy subsystem 420 anonymizes certain types of user information likely to include sensitive and/or identifying information, independent of user designation (e.g., automatically).

In some implementations, the NLP 252 is configured to perform natural language processing (or another speech recognition technique) on the audio data 402A or one or more temporal frames thereof. For example, the NLP 252 includes a processing model (e.g., a hidden Markov model, a dynamic time warping algorithm, or the like) or a machine learning node (e.g., a neural network, convolutional neural network, recurrent neural network, deep neural network, state vector machine, random forest algorithm, or the like) that performs speech-to-text (STT) processing.

In some implementations, the speech assessor 254 is configured to determine one or more speech characteristics associated with the audio data 402A (or one or more temporal frames thereof). For example, the one or more speech characteristics corresponds to intonation, cadence, accent, diction, articulation, pronunciation, and/or the like. For example, the speech assessor 254 performs speech segmentation on the audio data 402A in order to break the audio data 402A into words, syllables, phonemes, and/or the like and, subsequently, determines one or more speech characteristics therefor.

In some implementations, the body pose interpreter 256 is configured to determine one or more pose characteristics associated with the body pose data 402B (or one or more temporal frames thereof). For example, the body pose interpreter 256 determines an overall pose of the user (e.g., sitting, standing, crouching, etc.) for each sampling period (e.g., each image within the body pose data 402B) or predefined set of sampling periods (e.g., every N images within the body pose data 402B). For example, the body pose interpreter 256 determines rotational and/or translational coordinates for each joint, limb, and/or body portion of the user for each sampling period (e.g., each image within the body pose data 402B) or predefined set of sampling periods (e.g., every N images within the body pose data 402B). For example, the body pose interpreter 256 determines rotational and/or translational coordinates for specific body parts (e.g., head, hands, and/or the like) for each sampling period (e.g., each image within the body pose data 402B) or predefined set of sampling periods (e.g., every N images within the body pose data 402B).

In some implementations, the gaze direction determiner 258 is configured to determine a directionality vector associated with the eye tracking data 402C (or one or more temporal frames thereof). For example, the gaze direction determiner 258 determines a directionality vector (e.g., X, Y, and/or focal point coordinates) for each sampling period (e.g., each image within the eye tracking data 402C) or predefined set of sampling periods (e.g., every N images within the eye tracking data 402C).

In some implementations, an input characterization engine 250 is configured to generate an input characterization vector based on the outputs from the NLP 252, the speech assessor 254, the body pose interpreter 256, and the gaze direction determiner 258. In some implementations, the input characterization vector includes a dialogue portion that corresponds to the output from the NLP 252. In some implementations, the input characterization vector includes a dialogue delivery portion that corresponds to the output from the speech assessor 254. In some implementations, the input characterization vector includes a body pose portion that corresponds to the output from the body pose interpreter 256. In some implementations, the input characterization vector includes an eye tracking portion that corresponds to the output from the gaze direction determiner 258.

In some implementations, an input characterization engine 250 is also configured correlate the input characterization vector with at least a time slice indicator associated with a current time slice within predetermined content and a character identifier associated with a current character within predetermined (sometimes also referred to herein as the time slice-character tuple). In some implementations, the input characterization engine 250 is also configured correlate the input characterization vector with a content indicator associated with the predetermined content and a thematic scene indicator associated with a current thematic scene within the predetermined content. FIG. 5D, described in more detail below, illustrates an input characterization vector 550 associated with a respective time slice-character tuple (e.g., time slice 515A-character 532A).

In some implementations, the template selector 264 is configured to select a template characterization vector from the template library 266 based on the time slice-character tuple associated with the input characterization vector. In some implementations, the template library 266 includes a first plurality of template characterization vectors for first predetermined content (e.g., CGR content A, movie B, or the like) indexed based on time slice-character tuples associated with the first predetermined content. FIG. 5C, described in more detail below, illustrates a first template characterization vector 520A associated with a first time slice-character tuple (e.g., time slice 515A-character 532A) and a second template characterization vector 520B associated with a second time slice-character tuple (e.g., time slice 515A-character 532B).

In some implementations, the performance assessment engine 268 is configured to determine whether the input data (e.g., the audio data 402A, the body pose data 402B, and the gaze tracking data 402C) satisfies performance criteria associated with a respective time slice-character tuple based on a comparison between one or more portions of the input characterization vector for the respective time slice-character tuple and one or more portions of the selected template characterization vector associated with the respective time slice-character tuple. In some implementations, the performance assessment engine 268 obtains a most recent input characterization vector from a data buffer 430 that stores the input characterization vectors in a first-in-first-out (FIFO) manner.

Figure 6A:
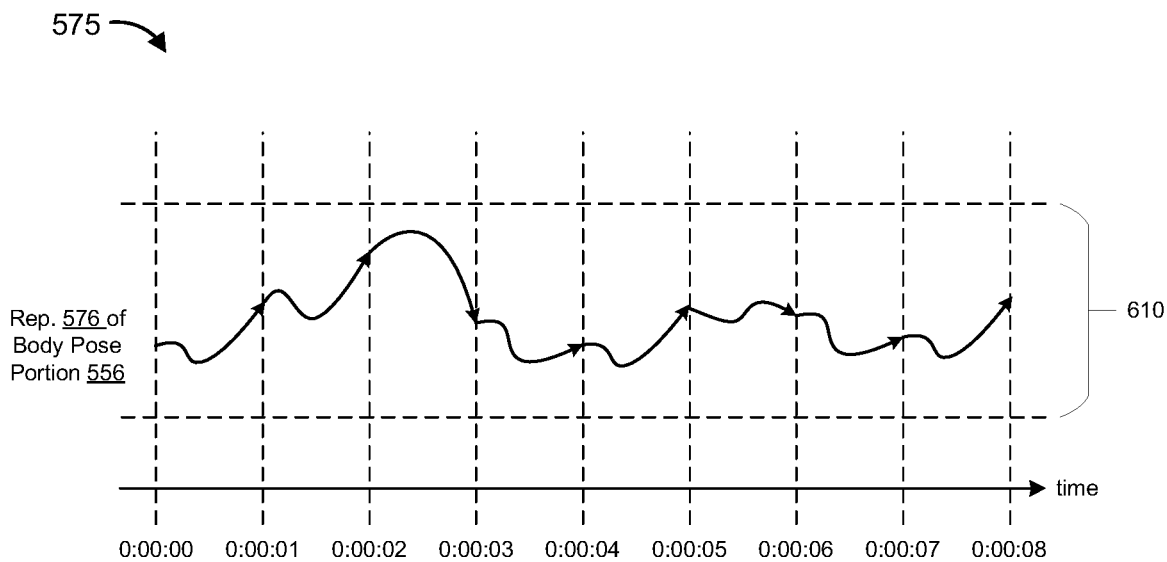
FIG. 6A illustrates the example abstract representation of the body pose portion of the input characterization vector in FIG. 5D relative to an acceptability threshold in accordance with some implementations.
Figure 6B:
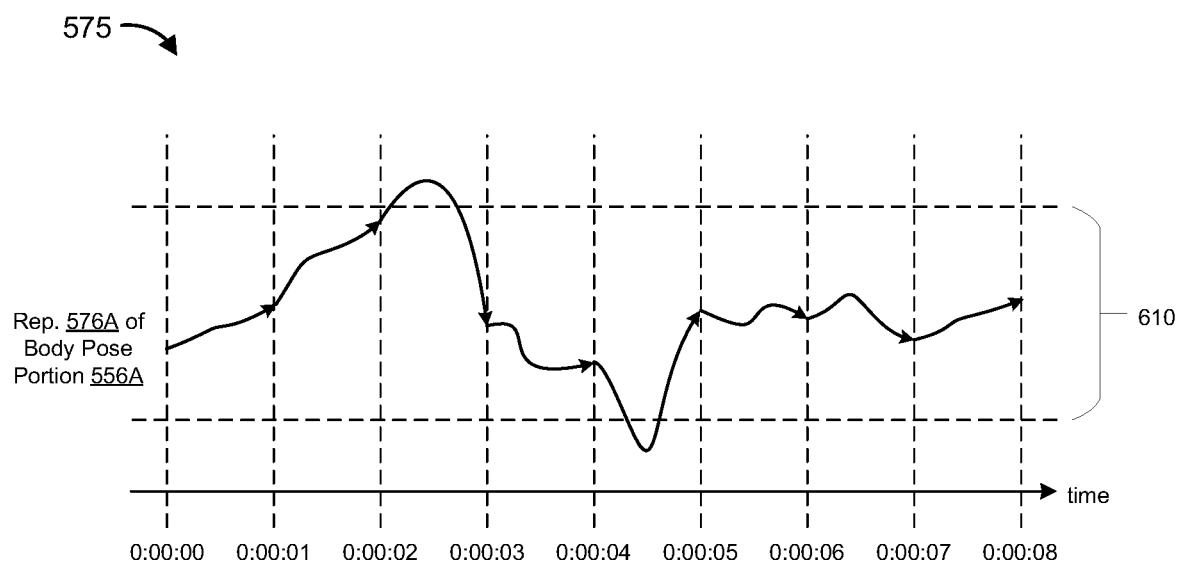
FIG. 6B illustrates another example abstract representation of a body pose portion of an input characterization vector relative to an acceptability threshold in accordance with some implementations.

In some implementations, each portion of the input characterization vector is associated with a different input modality-dialogue portion, dialogue delivery portion, body pose portion, eye tracking portion, or the like. Similarly, in some implementations, each portion of the template characterization vector is associated with a different input modality-dialogue portion, dialogue delivery portion, body pose portion, eye tracking portion, or the like. In some implementations, the performance criteria associated with the respective time slice-character tuple are satisfied based on a comparison between the one or more portions of the input characterization vector for the respective time slice-character tuple and one or more portions of the selected template characterization vector. In some implementations, the performance criteria are satisfied when the one or more portions of the input characterization vector are within acceptability thresholds. For example, each portion (e.g., dialogue portion, dialogue delivery portion, body pose portion, eye tracking portion, or the like) may be associated with a different acceptability threshold. FIGS. 6A and 6B, described in more detail below, show an acceptability threshold 610 for body pose portions 556 and 556A, respectively.

In some implementations, the CGR content manager 270 is configured to update the CGR environment presented via the CGR presentation pipeline 450 based on a CGR content from the CGR content library 460 for a next time slice of the predetermined content when the input data (e.g., the audio data 402A, the body pose data 402B, and the gaze tracking data 402C) satisfies the performance criteria associated with the current time slice-character tuple. In some implementations, the CGR content manager 270 is configured to maintain the CGR environment presented via the CGR presentation pipeline 450 based on the current time slice when the input data (e.g., the audio data 402A, the body pose data 402B, and the gaze tracking data 402C) does not satisfy the performance criteria associated with the current time slice-character tuple and prepare for a reattempt of the current time slice.

Figure 5A:
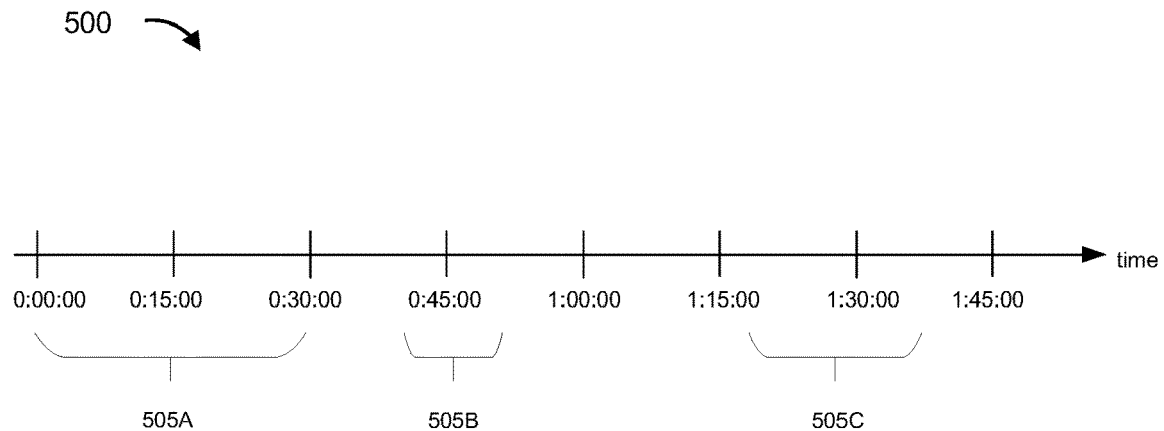
FIG. 5A illustrates an overview timeline associated with predetermined content in accordance with some implementations.

FIG. 5A illustrates an overview timeline 500 associated with predetermined content in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The overview timeline 500 illustrates thematic scenes 505A, 505B, and 505C within predetermined content (e.g., a movie, TV episode, theatrical play, historical event, or the like). As one example, the thematic scene 505A spans from time 0:00:00 to time 0:30:00 (i.e., 30 minutes) within the predetermined content. Those of ordinary skill in the art will appreciate from the present disclosure that the overview timeline 500 is a non-limiting example and that the predetermined content may be divided into any number of thematic scenes of arbitrary length in various implementations.

Figure 5B:
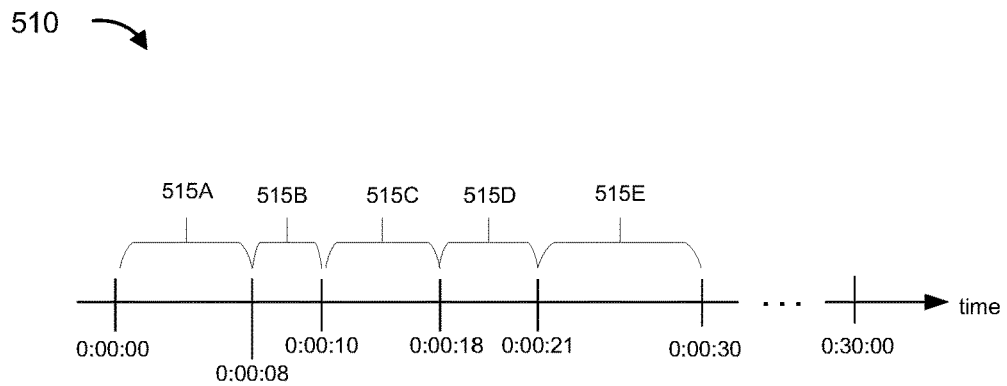
FIG. 5B illustrates a sub-timeline associated with a thematic scene with the predetermined content in accordance with some implementations.
Figure 5C:
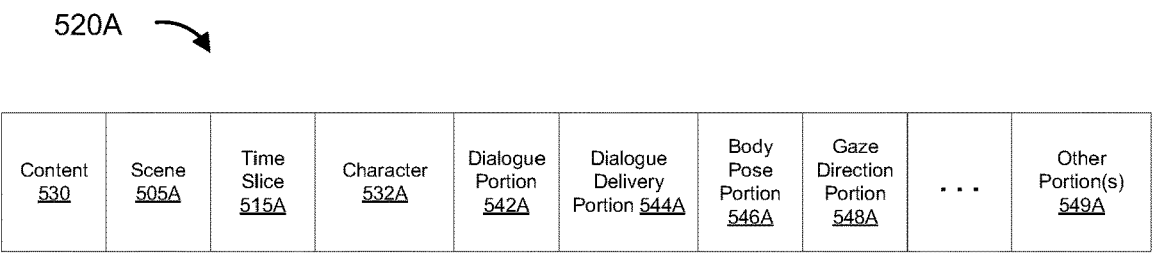
FIG. 5C illustrates example template characterization vectors in accordance with some implementations.
Figure 5C:
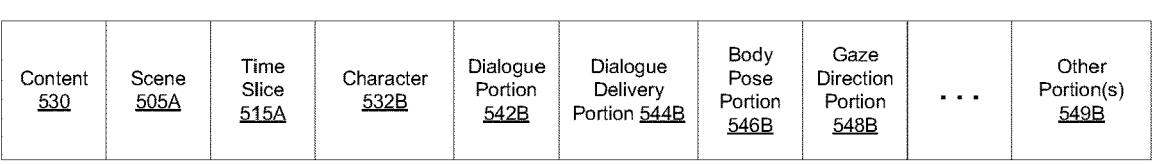
Figures 5D, 5E:
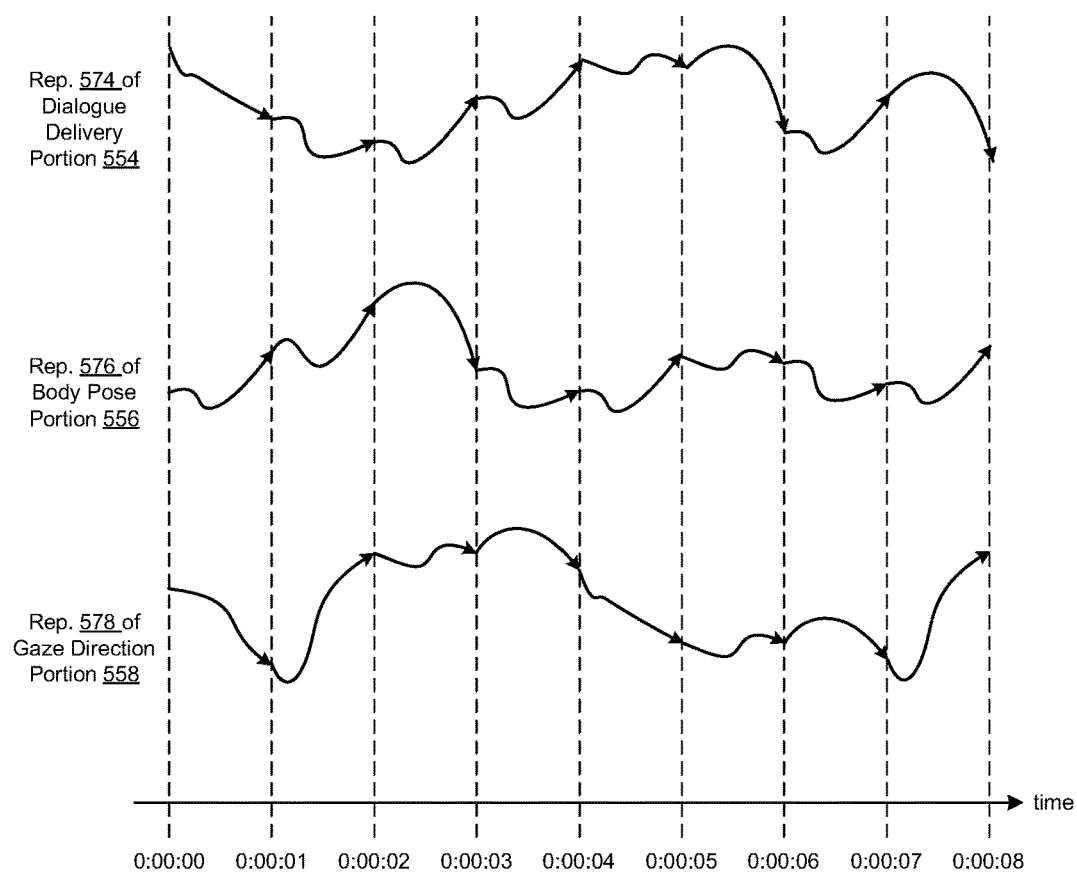
FIG. 5D illustrates an example input characterization vector in accordance with some implementations.
FIG. 5E illustrates example abstract representations associated with portions of the input characterization vector in FIG. 5D in accordance with some implementations.

FIG. 5B illustrates a sub-timeline 510 associated with the thematic scene 505A within the predetermined content in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The sub-timeline 510 illustrates time slices 515A, 515B, 515C, 515D, 515E, . . . (sometimes collectively referred to herein as the "time slices 515") within the thematic scene 505A. For example, the time slices 515 are determined based on keyframes associated with the thematic scene 505A. As another example, the time slices 515 are determined based on dialogue associated with the thematic scene 505A. As yet another example, the time slices 515 are determined based on actions associated with the thematic scene 505A. yet another example, the time slices 515 are determined based on a portion of the screenplay or the like for the predetermined content that corresponds to the thematic scene 505A. As one example, the time slice 515A spans from time 0:00:00 to time 0:00:08 (i.e., 8 seconds) within the predetermined content. Those of ordinary skill in the art will appreciate from the present disclosure that the sub-timeline 510 is a non-limiting example and that the thematic scene 505A content may be divided into any number of time slices of arbitrary length in various implementations.

FIG. 5C illustrates example template characterization vectors 520A and 520B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 5C, the first template characterization vector 520A includes: a content field corresponding to a content name of or unique identifier for predetermined content 530, a scene field corresponding to a unique identifier for the thematic scene 505A within the predetermined content 530, a time slice field corresponding to a unique identifier for the time slice 515A within the predetermined content 530, and a character field corresponding to a name of or a unique identifier for a character 532A within the predetermined content 530. The first template characterization vector 520A also includes a dialogue portion 542A corresponding to dialogue or a set of lines associated with the character 532A for the time slice 515A.

As shown in FIG. 5C, the first template characterization vector 520A further includes a dialogue delivery portion 544A associated with one or more speech characteristics (e.g., intonation, cadence, accent, diction, articulation, pronunciation, and/or the like) associated with the delivery of the dialogue portion 542A by the character 532A for the time slice 515A. The first template characterization vector 520A further includes a body pose portion 546A associated with one or more pose characteristics associated with the character 532A for the time slice 515A. For example, the one or more pose characteristics correspond to an overall pose of the character 532A for the time slice 515A (e.g., sitting, standing, crouching, etc.). As another example, the one or more pose characteristics correspond to rotational and/or translational coordinates for each joint, limb, and/or body portion of the character 532A for the time slice 515A. As yet another example, the one or more pose characteristics correspond to rotational and/or translational coordinates for specific body parts (e.g., head, hands, and/or the like) of the character 532A for the time slice 515A. The first template characterization vector 520A further includes a gaze direction portion 548A associated with a directionality vector (e.g., X, Y, and/or focal point coordinates) for the gaze of the character 532A for the time slice 515A.

As shown in FIG. 5C, the first template characterization vector 520A further includes one or more other portions 549A characterizing the character 532A during the time slice 515A. Those of ordinary skill in the art will appreciate from the present disclosure that the first template characterization vector 520A is a non-limiting example and that the first template characterization vector 520A may include other sub-divisions, identifiers, and/or portions in various implementations.

As shown in FIG. 5C, the second template characterization vector 520B includes: a content field corresponding to a content name of or unique identifier for predetermined content 530, a scene field corresponding to a unique identifier for the thematic scene 505A within the predetermined content 530, a time slice field corresponding to a unique identifier for the time slice 515A within the predetermined content 530, and a character field corresponding to a name of or unique identifier for a character 532B within the predetermined content 530. The second template characterization vector 520B also includes a dialogue portion 542B corresponding to dialogue or a set of lines associated with the character 532B for the time slice 515A.

As shown in FIG. 5C, the second template characterization vector 520B further includes a dialogue delivery portion 544B associated with one or more speech characteristics (e.g., intonation, cadence, accent, diction, articulation, pronunciation, and/or the like) associated with the delivery of the dialogue portion 542B by the character 532B for the time slice 515A. The second template characterization vector 520B further includes a body pose portion 546B associated with one or more pose characteristics associated with the character 532B for the time slice 515A. For example, the one or more pose characteristics correspond to an overall pose of the character 532B for the time slice 515A (e.g., sitting, standing, crouching, etc.). As another example, the one or more pose characteristics correspond to rotational and/or translational coordinates for each joint, limb, and/or body portion of the character 532B for the time slice 515A. As yet another example, the one or more pose characteristics correspond to rotational and/or translational coordinates for specific body parts (e.g., head, hands, and/or the like) of the character 532B for the time slice 515A. The second template characterization vector 520B further includes a gaze direction portion 548B associated with a directionality vector (e.g., X, Y, and/or focal point coordinates) for the gaze of the character 532B for the time slice 515A.

As shown in FIG. 5C, the second template characterization vector 520B further includes one or more other portions 549B characterizing the character 532B during the time slice 515A. Those of ordinary skill in the art will appreciate from the present disclosure that the second template characterization vector 520B is a non-limiting example and that the second template characterization vector 520B may include other sub-divisions, identifiers, and/or portions in various implementations. As shown in FIG. 5C, the first template characterization vector 520A is associated with a first time slice-character tuple (e.g., time slice 515A-character 532A). The second template characterization vector 520B is associated with a second time slice-character tuple (e.g., time slice 515A-character 532B) different from the first time slice-character tuple associated with the first template characterization vector 520A.

FIG. 5D illustrates an example input characterization vector 550 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 5D, the input characterization vector 550 includes: a content field corresponding to a content name of or unique identifier for the predetermined content 530, a scene field corresponding to a unique identifier for the thematic scene 505A within the predetermined content 530, a time slice field corresponding to a unique identifier for the time slice 515A within the predetermined content 530, and a character field corresponding to a name of or unique identifier for a character 532A within the predetermined content 530. The input characterization vector 550 also includes a dialogue portion 552 corresponding to speech-to-text output associated with audio data collected from a user for the time slice 515A.

As shown in FIG. 5D, the input characterization vector 550 further includes a dialogue delivery portion 554 associated with one or more speech characteristics (e.g., intonation, cadence, accent, diction, articulation, pronunciation, and/or the like) associated with the audio data collected from a user for the time slice 515A. The input characterization vector 550 further includes a body pose portion 556 associated with one or more pose characteristics associated with the user for the time slice 515A. For example, the one or more pose characteristics correspond to an overall pose of the user for the time slice 515A (e.g., sitting, standing, crouching, etc.). As another example, the one or more pose characteristics correspond to rotational and/or translational coordinates for each joint, limb, and/or body portion of the user for the time slice 515A. As yet another example, the one or more pose characteristics correspond to rotational and/or translational coordinates for specific body parts (e.g., head, hands, and/or the like) of the user for the time slice 515A. The input characterization vector 550 further includes a gaze direction portion 558 associated with a directionality vector (e.g., X, Y, and/or focal point coordinates) for the gaze of the user for the time slice 515A.

As shown in FIG. 5D, the input characterization vector 550 further includes one or more other portions 559 characterizing the user during the time slice 515A. Those of ordinary skill in the art will appreciate from the present disclosure that the input characterization vector 550 is a non-limiting example and that the input characterization vector 550 may include other sub-divisions, identifiers, and/or portions in various implementations. As shown in FIG. 5D, the input characterization vector 550 associated with a respective time slice-character tuple (e.g., time slice 515A-character 532A) that is also associated with the first template characterization vector 520A in FIG. 5C.

FIG. 5E illustrates abstract representations 574, 576, and 578 associated with portions of the input characterization vector 550 in FIG. 5D in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As shown in FIG. 5E, the abstract representations 574, 576, and 578 are overlaid on a sub-timeline 575 for the time slice 515A. For example, as mentioned above, the time slice 515A spans from time 0:00:00 to time 0:00:08 (i.e., 8 seconds) within the predetermined content.

As shown in FIG. 5E, the abstract representation 574 corresponds to the dialogue delivery portion 554. For example, the abstract representation 574 corresponds to a composite or aggregate signal for the one or more speech characteristics included within the dialogue delivery portion 554 (e.g., intonation, cadence, accent, diction, articulation, pronunciation, and/or the like). In various implementations, as will be understood by one of ordinary skill in the art, the abstract representation 574 may be decomposed into a plurality of separate signals for each of the one or more speech characteristics included within the dialogue delivery portion 554.

As shown in FIG. 5E, the abstract representation 576 corresponds to the body pose portion 556. For example, the abstract representation 576 corresponds to a composite or aggregate signal for the one or more body pose characteristics included within the body pose portion 556 (e.g., overall pose; rotational and/or translational coordinates for each joint, limb, and/or body portion; rotational and/or translational coordinates for specific body parts; and/or the like). In various implementations, as will be understood by one of ordinary skill in the art, the abstract representation 576 may be decomposed into a plurality of separate signals for each of the one or more body pose characteristics included within the body pose portion 556.

As shown in FIG. 5E, the abstract representation 578 corresponds to the gaze direction portion 558. For example, the abstract representation 578 corresponds to a composite or aggregate signal for the directionality vector included within the gaze direction portion 558 (e.g., X, Y, and/or focal point coordinates). In various implementations, as will be understood by one of ordinary skill in the art, the abstract representation 578 may be decomposed into a plurality of separate signals for each component of the directionality vector included within the gaze direction portion 558.

FIG. 6A illustrates the abstract representation 576 of the body pose portion 556 of the input characterization vector 550 in FIG. 5D relative to an acceptability threshold 610 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 6A, the abstract representation 576 of the body pose portion 556 of the input characterization vector 550 is overlaid on the sub-timeline 575 for the time slice 515A. For example, as mentioned above, the time slice 515A spans from time 0:00:00 to time 0:00:08 (i.e., 8 seconds) within the predetermined content. As shown in FIG. 6A, the abstract representation 576 of the body pose portion 556 is within an acceptability threshold 610 for the body pose portion. In various implementations, as will be understood by one of ordinary skill in the art, the acceptability threshold 610 may be tightened/narrowed or loosened/widened. In various implementations, as will be understood by one of ordinary skill in the art, the acceptability threshold 610 may be signal with a predefined tolerance width instead of a predefined tolerance envelope as shown in FIG. 6A.

In some implementations, performance criteria associated with a respective time slice-character tuple (e.g., time slice 515A-character 532A) are satisfied when the one or more portions of the input characterization vector 550 for the respective time slice-character tuple are within acceptability thresholds associated with the one or more portions of the first template characterization vector 520A. For example, each portion (e.g., the dialogue portion 542A, the dialogue delivery portion 544A, the body pose portion 546A, the eye tracking portion 548A, or the like) may be associated with a different acceptability threshold.

In some implementations, the acceptability threshold changes based on previous input data associated with a previous time slices satisfying the acceptability threshold. For example, if a threshold number of previous time slices satisfy the acceptability threshold, the controller 110 and/or the electronic device 120 narrow (e.g., tighten or constrict) the acceptability threshold. If a threshold number of previous time slices breach the acceptability threshold, the controller 110 and/or the electronic device 120 widen (e.g., loosen or relax) the acceptability threshold.

In some implementations, a degree of change in the acceptability threshold is a function of a level of breach by a previous time slice. For example, if previous input data for previous time slices breached the acceptability threshold by 5-10%, then the controller 110 and/or the electronic device 120 widen the acceptability threshold by 12%. However, if previous input data for previous time slices breached the acceptability threshold by 20-30%, then the controller 110 and/or the electronic device 120 widen the acceptability threshold by 35%.

In some implementations, changing the acceptability threshold based on previous user input for previous time slices enhances user experience by changing the acceptability threshold based on previous time slices for users with different skill levels. Narrowing the acceptability threshold encourages the user to improve across time slices. Widening the acceptability threshold allows the user to satisfy the acceptability threshold even if the user inputs are not a close match to template inputs.

FIG. 6B illustrates another example abstract representation 576A of a body pose portion 556A of an input characterization vector relative to an acceptability threshold in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 6B, the abstract representation 576A of the body pose portion 556A of an input characterization vector is overlaid on the sub-timeline 575 for the time slice 515A. For example, as mentioned above, the time slice 515A spans from time 0:00:00 to time 0:00:08 (i.e., 8 seconds) within the predetermined content. As shown in FIG. 6B, the abstract representation 576A of the body pose portion 556A breaches the acceptability threshold 610 for the body pose portion in both the 0:00:02 to 0:00:03 and 0:00:04 to 0:00:05 time windows.

Figure 7:
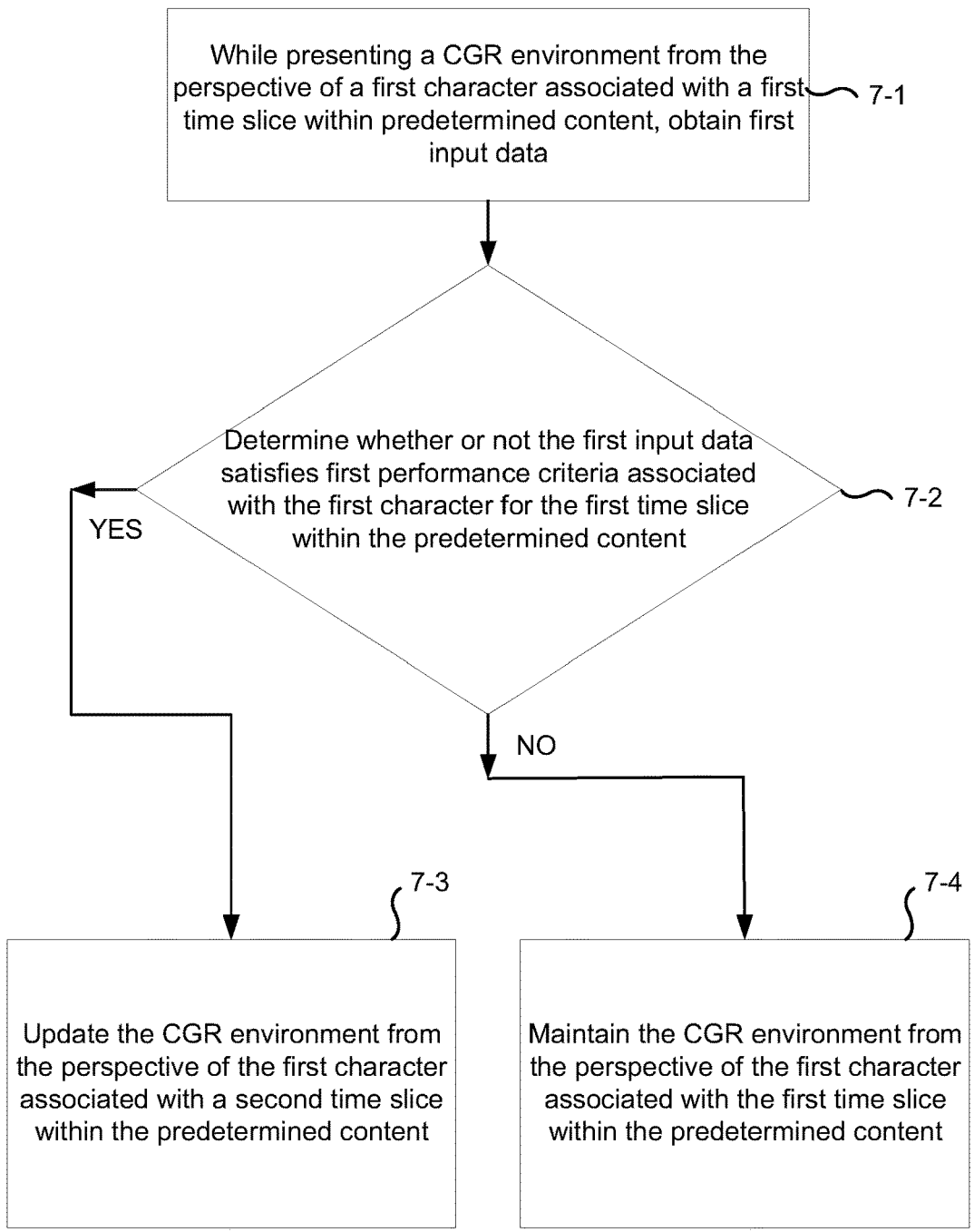
FIG. 7 is a flowchart representation of a method of performance-based progression of CGR content in accordance with some implementations.

FIG. 7 is a flowchart representation of a method 700 of performance-based progression of computer-generated reality (CGR) content in accordance with some implementations. In various implementations, the method 700 is performed by a device with one or more processors and non-transitory memory (e.g., the controller 110 in FIGS. 1 and 2; the electronic device 120 in FIGS. 1 and 3; or a suitable combination thereof) or a component thereof. In some implementations, the method 700 is performed by processing logic, including hardware, firmware, software, or a combination thereof. In some implementations, the method 700 is performed by a processor executing code stored in a non-transitory computer-readable medium (e.g., a memory).

For example, the electronic device 120 obtains audio data associated with an attempt by a user to deliver dialogue associated with a first character for a first time slice within predetermined content (e.g., a set of lines for a character associated with the first time slice of a movie or TV episode). Continuing with this example, the electronic device 120 also obtains body pose data and eye tracking data associated with an attempt of a user to mimic the acting, body language, facial expressions, actions, and/or the like associated with the first character for the first time slice within the predetermined content (e.g., acting for the character associated with the first time slice of the movie or TV episode). In other words, the user attempts to mimic the character within the predetermined content (e.g., dialogue and the delivery thereof) and is scored on a time slice by time slice basis by the device. If the user attempt to mimic a character for the first time slice satisfies performance criteria, the device updates the CGR environment such that the user progresses to a next time slice of the predetermined content. However, if the user attempt to mimic the character for the first time slice does not satisfy the performance criteria, the device maintains the CGR environment and allows the user to reattempt the first time slice of the predetermined content.

As represented by block 7-1, the method 700 includes obtaining first input data while presenting a CGR environment from the perspective of a first character associated with a first time slice within predetermined content. For example, the first time slice corresponds to a sampling period associated with a thematic scene within a theatrical play, movie, TV episode, historical event, fictional story, live event, etc. In some implementations, the first input data is obtained from a user of the device via image sensors, microphones, and/or the like that are local to and/or remote from the device. As shown in FIG. 5D, the input characterization vector 550 includes a dialogue portion 552 associated with audio data from a user, a dialogue delivery portion 554 associated with audio data from the user, a body pose portion 556 associated with body pose data from the user, and a gaze direction portion 558 associated with eye tacking data from the user.

In some implementations, the first input data correspond to a set of lines (and their intonation, cadence, etc.) associated with the first character for the first time slice within the predetermined content. In some implementations, the first input data corresponds to a body pose (or action) associated with the first character for the first time slice within the predetermined content. In some implementations, the first input data corresponds to facial expressions associated with the first character for the first time slice within the predetermined content. In some implementations, the first input data corresponds to a gaze direction associated with the first character for the first time slice within the predetermined content.

In some implementations, the first input data is obtained from at least one of: a microphone, an inertial measurement unit (IMU), an accelerometer, a gyroscope, an exterior-facing image sensor, a gaze tracking device, or one or more physiological sensors. For example, the input devices are located local to and/or remote from the device.

In some implementations, the first time slice corresponds to a predetermined sampling period for the predetermined content. For example, the first time slice corresponds to a predetermined global length for the predetermined content such as X second time slices.

In some implementations, the first time slice corresponds to a predetermined sampling period for a current thematic scene within the predetermined content. For example, the first time slice corresponds to a predetermined time slice for a current thematic scene within the predetermined content such as a time slice of dialogue or a complete monologue.

As represented by block 7-2, the method 700 includes determining whether or not the first input data satisfies first performance criteria associated with the first character for the first time slice within the predetermined content. For example, the device determines whether the lines delivered by the user match a predetermined set of lines associated with the first character for the first time slice within a tolerance threshold based on speech processing. content. For example, the device determines whether the acting of the user matches a predetermined acting sequence associated with the first character for the first time slice within a tolerance threshold based on body pose and gaze tracking.

In some implementations, the first input data includes audio information, and wherein the first performance criteria associated with the first character for the first time slice within predetermined content is satisfied when the audio information matches a set of predetermined dialogue that corresponds to the first character for the first time slice within the predetermined content. As shown in FIG. 5D, the input characterization vector 550 includes a dialogue portion 552.

In some implementations, the first input data includes audio information, and wherein the first performance criteria associated with the first character for the first time slice within predetermined content is satisfied when the audio information matches a set of predetermined dialogue that corresponds to the first character for the first time slice within the predetermined content and a set of predetermined characteristics for the set of predetermined dialogue corresponds to the first character for the first time slice within the predetermined content. For example, the set of predetermined characteristics for the set of predetermined dialogue includes speech characteristics such as intonation, accent, cadence, pitch, pronunciation, and/or the like. As shown in FIG. 5D, the input characterization vector 550 includes a dialogue delivery portion 554.

In some implementations, the first input data includes body pose information, and wherein the first performance criteria associated with the first character for the first time slice within predetermined content is satisfied when the body pose information matches a predetermined body pose that corresponds to the first character for the first time slice within the predetermined content. For example, the predetermined body pose corresponds to a predetermined action performed by the first character for the first time slice within the predetermined content such as walking in a particular path/direction, moving or picking up items, moving limbs or pointing, etc. In another example, the predetermined body pose corresponds to particular pose characteristics such as rotational and/or translational coordinates for select body parts or the like. As shown in FIG. 5D, the input characterization vector 550 includes a body pose portion 556.

In some implementations, the first input data includes gaze information, and wherein the first performance criteria associated with the first character for the first time slice within predetermined content is satisfied when the gaze information matches a predetermined gaze direction that corresponds to the first character for the first time slice within the predetermined content. As shown in FIG. 5D, the input characterization vector 550 includes a gaze direction portion 558.

If the first input data satisfies the first performance criteria associated with the first character for the first time slice within the predetermined content ("YES" branch from block 7-2), the method 700 continues to block 7-3. If the first input data does not satisfy the first performance criteria associated with the first character for the first time slice within the predetermined content ("NO" branch from block 7-2), the method 700 continues to block 7-8.

As represented by block 7-3, the method 700 includes updating the CGR environment from the perspective of the first character associated with a second time slice in the predetermined content. In some implementations, the predetermined content seamlessly advances to the set of lines or next scene within the predetermined content. In some implementations, the user is able to select a different character for the same time slice or thematic scene. In some implementations, the user is able to select a different time slice or thematic scene for the same character. In some implementations, the user selects a different character and a different time slice or thematic scene.

In some implementations, the method 700 further includes determining a score associated with the first input data and presenting the score that corresponds to the first input data. For example, the device presents CGR content associated with a current aggregate score for the user across multiple time slices and also a score for a most recent time slice. For example, the score represented a delta between the user input and the ground truth for the character within the predetermined content.

In some implementations, the method 700 further includes obtaining second input data while presenting the CGR environment from the perspective of the first character associated with a second time slice within predetermined content. In some implementations, the method 700 further includes determining whether or not the second input data satisfies second performance criteria associated with the first character for the second time slice within the predetermined content. In some implementations, the first performance criteria associated with the first character for the first time slice within the predetermined content are different from second performance criteria associated with the first character for a second time slice within the predetermined content. In some implementations, the first performance criteria associated with the first character for the first time slice within the predetermined content are different from third performance criteria associated with a second character for the first time slice within the predetermined content.

As represented by block 7-4, the method 700 includes maintaining the CGR environment from the perspective of the first character associated with the first time slice in the predetermined content. In some implementations, the predetermined content is reset to the beginning of the first time slice, for example, a thematic scene or dialogue portion (e.g., a set of lines).

Figure 8A:
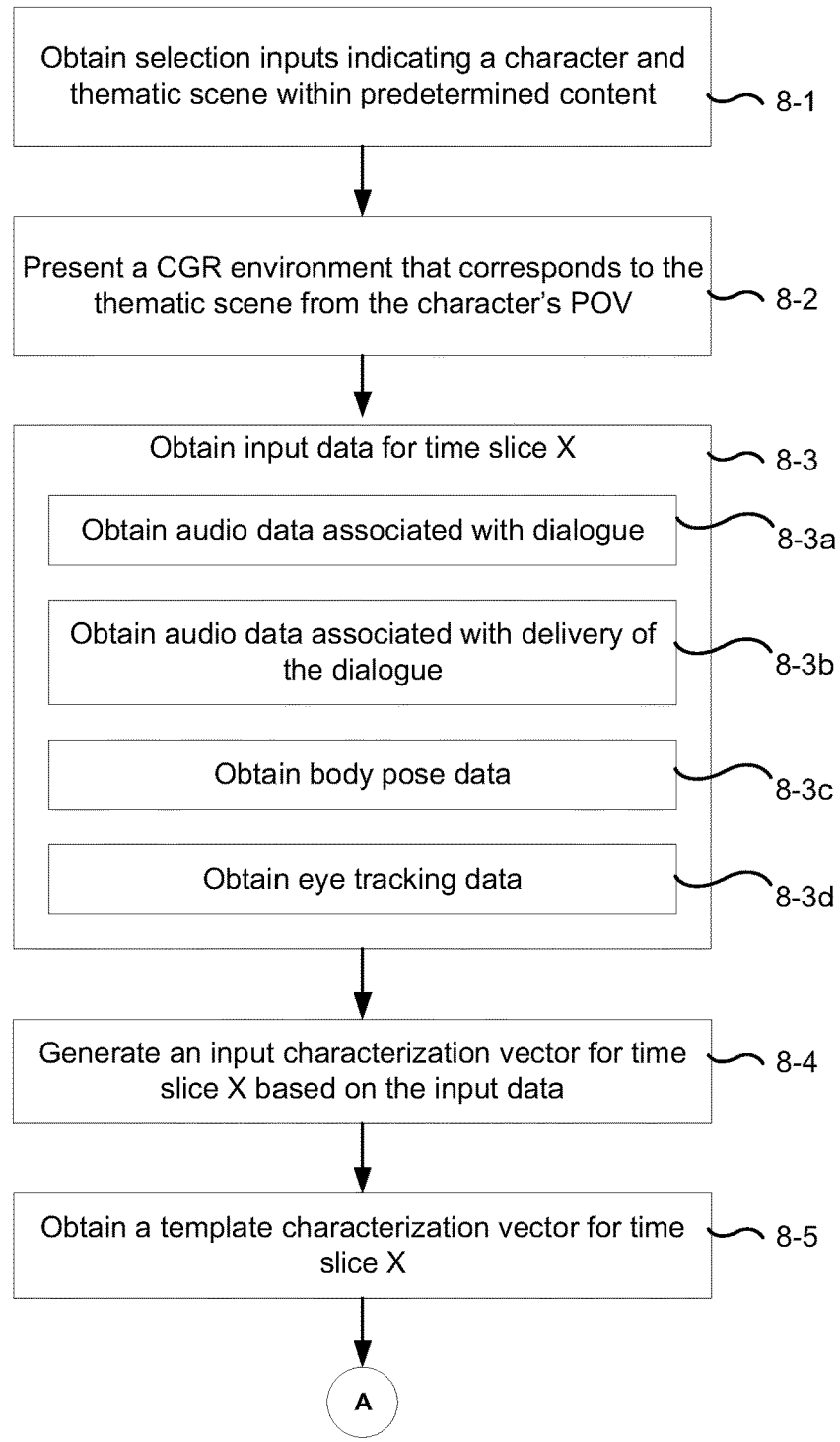
FIGS. 8A and 8B illustrate a flowchart representation of a method of performance-based progression of CGR content in accordance with some implementations.
Figure 8B:
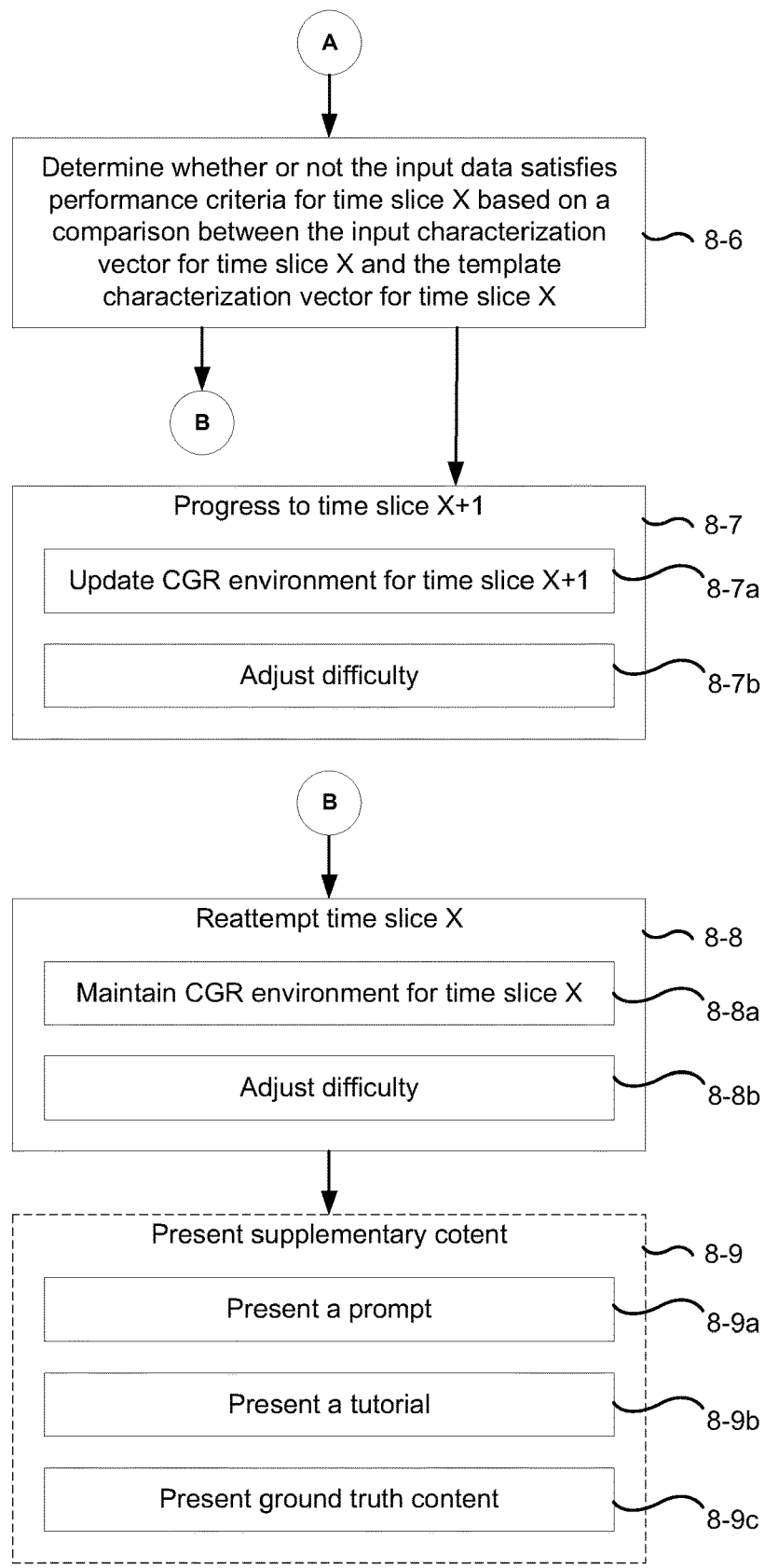

FIGS. 8A and 8B illustrate a flowchart representation of a method 800 of performance-based progression of computer-generated reality (CGR) content in accordance with some implementations. In various implementations, the method 800 is performed by a device with one or more processors and non-transitory memory (e.g., the controller 110 in FIGS. 1 and 2; the electronic device 120 in FIGS. 1 and 3; or a suitable combination thereof) or a component thereof. In some implementations, the method 800 is performed by processing logic, including hardware, firmware, software, or a combination thereof. In some implementations, the method 800 is performed by a processor executing code stored in a non-transitory computer-readable medium (e.g., a memory).

As represented by block 8-1, the method 800 includes obtaining selection inputs indicating a character and thematic scene within predetermined content. For example, the device detects selection inputs from the user (e.g., a voice command, touch inputs relative to a selection menu, or the like) indicating a thematic scene and a character for which the user wishes to attempt to mimic.

As one example, prior to obtaining the selection inputs, the device presents CGR content associated with the predetermined content, such as a movie, television episode, or other media content, via the device (e.g., a near-eye system, tablet, mobile phone, tablet, laptop or the like). Continuing with this example, while presenting the CGR content, the device displays a prompt indicating that a performance-based progression mode is available for a current thematic scene (or future thematic scene) within the predetermined content whereby the user is able to select a character or role within the CGR content to mimic (or act out) in order to progress CGR content.

As another example, prior to obtaining the selection inputs, a second device (e.g., a television, tablet, laptop, or the like) separate from the device displays predetermined flat media content, such as a movie, television episode, or the like, to the user. Continuing with this example, the device displays a prompt indicating that a performance-based progression mode is available for a current thematic scene (or future thematic scene) within the predetermined flat media content whereby the user is able to select a character or role to mimic (or act out) in order to progress CGR content associated with the predetermined flat media content.

As represented by block 8-2, the method 800 includes presenting a CGR environment that corresponds to the thematic scene from the character's point-of-view (POV). For example, the device presents CGR content to the user such that the user "sees" through the eyes of the character while the CGR environment corresponds to the background associated with the thematic scene.

As represented by block 8-3, the method 800 includes obtaining input data for time slice X. With reference to FIG. 4, for example, the data processing architecture 400 obtains audio data 402A, body pose data 402B, and/or eye tracking data 402C associated with the user.

In some implementations, as represented by block 8-3*a*, the input data includes audio data associated with dialogue. With reference to FIG. 4, for example, the NLP 252 performs STT processing on the audio data 402A.

In some implementations, as represented by block 8-3*b*, the input data includes audio data associated with delivery of the dialogue. With reference to FIG. 4, for example, the speech assessor 254 determines one or more speech characteristics associated with the audio data 402A (e.g., intonation, cadence, accent, diction, articulation, pronunciation, and/or the like).

In some implementations, as represented by block 8-3*c*, the input data includes body pose data. With reference to FIG. 4, for example, the body pose interpreter 256 determines one or more pose characteristics associated with the body pose data 402B

In some implementations, as represented by block 8-3*d*, the input data includes eye tracking. With reference to FIG. 4, for example, the gaze direction determiner 258 determines a directionality vector associated with the eye tracking data 402C.

As represented by block 8-4, the method 800 includes generating an input characterization vector for time slice X based on the input data. With reference to FIGS. 4 and 5D, for example, the input characterization engine 250 generates an input characterization vector 550 that includes a dialogue portion 552 based on the output of the NLP 252, a dialogue delivery portion 554 based on the output of the speech assessor 254, a body pose portion 556 based on the output of the body pose interpreter 256, and a gaze direction portion 558 based on the output of the gaze direction determiner 258.

As represented by block 8-5, the method 800 includes obtaining a template characterization vector for time slice X. With reference to FIGS. 4 and 5C, for example, the template selector 264 selects the first template characterization vector 520A from the template library 266 based on the time slice-character tuple (e.g., time slice 515A-character 532A).

As represented by block 8-6, the method 800 includes determining whether or not the input data satisfies performance criteria for time slice X based on a comparison between the input characterization vector for time slice X and the template characterization vector for time slice X. With reference to FIGS. 4, 5C, and 5D, the performance assessment engine 268 determines whether or not the input data satisfies performance criteria for the character 532A for the time slice 515A based on a comparison between the input characterization vector 550 in FIG. 5D for time slice 515A and the first template characterization vector 520A in FIG. 5C for time slice 515A.

As represented by block 8-7, the method 800 includes progressing to time slice X+1 in response to determining that the input data satisfies the performance criteria for time slice X. In some implementations, as represented by block 8-7*a*, the method 800 includes updating the CGR environment for time slice X+1. In some implementations, as represented by block 8-7*b*, the method 800 includes adjusting the difficulty for time slice X+1. For example, the device increases the difficulty for time slice X+1 by modifying the performance criteria for time slice X+1 such as narrowing one or more acceptability thresholds.

As represented by block 8-8, the method 800 optionally includes reattempting time slice X in response to determining that the input data does not satisfy the performance criteria for time slice X. In some implementations, as represented by block 8-8*a*, the method 800 includes maintaining the CGR environment for time slice X. In some implementations, as represented by block 8-8*b*, the method 800 includes adjusting the difficulty for time slice X. For example, the device decreases the difficulty for the reattempt of time slice X by modifying the performance criteria for time slice X such as widening one or more acceptability thresholds.

As represented by block 8-9, the method 800 optionally includes presenting supplementary content in response to determining that the input data does not satisfy the performance criteria for time slice X. In some implementations, as represented by block 8-9*a*, the method 800 includes presenting a prompt. For example, the device presents CGR content including a prompt notification to reattempt the time slice X. In some implementations, as represented by block 8-9*b*, the method 800 includes presenting a tutorial associated with time slice X. For example, the device presents CGR content including a tutorial on delivering the dialogue associated with the character for the time slice X (e.g., a coaching session). In some implementations, as represented by block 8-9*c*, the method 800 includes presenting ground truth content associated with time slice X. For example, the device presents CGR content including a third-person view of the portion of the predetermined content associated with time slice X so that the user is able to see the ground truth content for time slice X.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including non-transitory memory and one or more processors coupled with the non-transitory memory:
   while presenting a computer-generated reality (CGR) environment from the perspective of a first character associated with a first time slice within predetermined content including a timeline with a sequence of time slices, wherein the sequence of time slices includes the first time slice and a second time slice, obtaining first input data;
   determining whether or not the first input data satisfies first performance criteria associated with the first character for the first time slice; and
   in response to determining that the first input data satisfies the first performance criteria associated with the first character for the first time slice, updating the CGR environment from the perspective of the first character associated with the second time slice.

2. The method of claim 1 further comprising, in response to determining that the first input data does not satisfy the first performance criteria associated with the first character for the first time slice, maintaining the CGR environment from the perspective of the first character associated with the first time slice.

3. The method of claim 2 further comprising, in response to determining that the first input data does not satisfy the first performance criteria associated with the first character for the first time slice, presenting a prompt notification.

4. The method of claim 2 further comprising, in response to determining that the first input data does not satisfy the first performance criteria associated with the first character for the first time slice, presenting a tutorial associated with the first character for the first time slice.

5. The method of claim 2 further comprising, in response to determining that the first input data does not satisfy the first performance criteria associated with the first character for the first time slice, presenting a third-person view of the predetermined content for the first time slice.

6. The method of claim 1, wherein the first input data is obtained from at least one of: a microphone, an inertial measurement unit (IMU), an accelerometer, a gyroscope, an exterior-facing image sensor, a gaze tracking device, or one or more physiological sensors.

7. The method of claim 1, wherein the first input data includes audio information, and wherein the first performance criteria associated with the first character for the first time slice is satisfied when the audio information matches a set of predetermined dialogue that corresponds to the first character for the first time slice.

8. The method of claim 1, wherein the first input data includes body pose information, and wherein the first performance criteria associated with the first character for the first time slice is satisfied when the body pose information matches predetermined body pose information that corresponds to the first character for the first time slice.

9. The method of claim 1, wherein the first input data includes facial information, and wherein the first performance criteria associated with the first character for the first time slice is satisfied when the facial information matches predetermined facial expression information that corresponds to the first character for the first time slice.

10. The method of claim 1, wherein the first input data includes gaze information, and wherein the first performance criteria associated with the first character for the first time slice is satisfied when the gaze information matches predetermined gaze direction information that corresponds to the first character for the first time slice.

11. The method of claim 1, further comprising:
    while presenting the CGR environment from the perspective of the first character associated with the second time slice, obtaining second input data; and
    determining whether or not the second input data satisfies second performance criteria associated with the first character for the second time slice.

12. The method of claim 1, further comprising:
    determining a score associated with the first input data; and
    presenting the score that corresponds to the first input data.

13. The method of claim 1, wherein the first time slice corresponds to a predetermined sampling period for the predetermined content.

14. The method of claim 1, wherein the first time slice corresponds to a predetermined sampling period for a current thematic scene within the predetermined content.

15. A device comprising:
one or more processors;
a non-transitory memory; and
one or more programs stored in the non-transitory memory, which, when executed by the one or more processors, cause the device to:
while presenting a computer-generated reality (CGR) environment from the perspective of a first character associated with a first time slice within predetermined content including a timeline with a sequence of time slices, wherein the sequence of time slices includes the first time slice and a second time slice, obtain first input data;
determine whether or not the first input data satisfies first performance criteria associated with the first character for the first time slice; and
in response to determining that the first input data satisfies the first performance criteria associated with the first character for the first time slice, update the CGR environment from the perspective of the first character associated with the second time slice.

16. The device of claim 15, wherein the one or more programs further cause the device to:
in response to determining that the first input data does not satisfy the first performance criteria associated with the first character for the first time slice, maintain the CGR environment from the perspective of the first character associated with the first time slice.

17. The device of claim 15, wherein the first input data includes audio information, and wherein the first performance criteria associated with the first character for the first time slice is satisfied when the audio information matches a set of predetermined dialogue that corresponds to the first character for the first time slice.

18. The device of claim 15, wherein the first input data includes body pose information, and wherein the first performance criteria associated with the first character for the first time slice is satisfied when the body pose information matches predetermined body pose information that corresponds to the first character for the first time slice.

19. The device of claim 15, wherein the first input data includes facial information, and wherein the first performance criteria associated with the first character for the first time slice is satisfied when the facial information matches predetermined facial expression information that corresponds to the first character for the first time slice.

20. The device of claim 15, wherein the first input data includes gaze information, and wherein the first performance criteria associated with the first character for the first time slice is satisfied when the gaze information matches predetermined gaze direction information that corresponds to the first character for the first time slice.

21. A non-transitory memory storing one or more programs, which, when executed by one or more processors of a device, cause the device to:
while presenting a computer-generated reality (CGR) environment from the perspective of a first character associated with a first time slice within predetermined content including a timeline with a sequence of time slices, wherein the sequence of time slices includes the first time slice and a second time slice, obtain first input data;
determine whether or not the first input data satisfies first performance criteria associated with the first character for the first time slice; and
in response to determining that the first input data satisfies the first performance criteria associated with the first character for the first time slice, update the CGR environment from the perspective of the first character associated with the second time slice.

22. The non-transitory memory of claim 21, wherein the one or more programs further cause the device to:
in response to determining that the first input data does not satisfy the first performance criteria associated with the first character for the first time slice, maintain the CGR environment from the perspective of the first character associated with the first time slice.

23. The non-transitory memory of claim 21, wherein the first input data includes audio information, and wherein the first performance criteria associated with the first character for the first time slice is satisfied when the audio information matches a set of predetermined dialogue that corresponds to the first character for the first time slice.

24. The non-transitory memory of claim 21, wherein the first input data includes body pose information, and wherein the first performance criteria associated with the first character for the first time slice is satisfied when the body pose information matches predetermined body pose information that corresponds to the first character for the first time slice.

25. The non-transitory memory of claim 21, wherein the first input data includes facial information, and wherein the first performance criteria associated with the first character for the first time slice is satisfied when the facial information matches predetermined facial expression information that corresponds to the first character for the first time slice.

26. The non-transitory memory of claim 21, wherein the first input data includes gaze information, and wherein the first performance criteria associated with the first character for the first time slice is satisfied when the gaze information matches predetermined gaze direction information that corresponds to the first character for the first time slice.

* * * * *